(12) United States Patent
Yamazaki

(10) Patent No.: US 10,795,617 B2
(45) Date of Patent: Oct. 6, 2020

(54) INFORMATION PROCESSING APPARATUS AND CONTROL METHOD

(71) Applicant: CANON KABUSHIKI KAISHA, Tokyo (JP)

(72) Inventor: Shinya Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/459,266

(22) Filed: Jul. 1, 2019

(65) Prior Publication Data

US 2020/0012459 A1  Jan. 9, 2020

(30) Foreign Application Priority Data

Jul. 5, 2018 (JP) .................. 2018-128371

(51) Int. Cl.
  *G06F 15/00* (2006.01)
  *G06F 3/12* (2006.01)
  *G06K 1/00* (2006.01)

(52) U.S. Cl.
  CPC .......... *G06F 3/1205* (2013.01); *G06F 3/1256* (2013.01)

(58) Field of Classification Search
  CPC .................. G06F 3/1205; G06F 3/1256
  USPC ................. 358/1.13, 1.1, 1.15, 1.14
  See application file for complete search history.

(56) References Cited

U.S. PATENT DOCUMENTS

2010/0110500 A1* 5/2010 Inoue ............ G06F 3/1205
                                                      358/468
2020/0004478 A1* 1/2020 Saito ............. G06F 3/121

FOREIGN PATENT DOCUMENTS

JP       2017-16480 A    1/2017

* cited by examiner

*Primary Examiner* — Douglas Q Tran
(74) *Attorney, Agent, or Firm* — Canon U.S.A., Inc. IP Division

(57) ABSTRACT

An information processing apparatus provided with print data generating software and an extension application that is different from the print data generating software includes a generating unit that generates settings information based on information input on a settings screen provided by the extension application and a performing unit that performs an extended function provided by the extension application based on the generated settings information. Information regarding the extended function is processed so as not be edited by an operating system (OS) and print data is generated based on the settings information by the print data generating software.

16 Claims, 14 Drawing Sheets

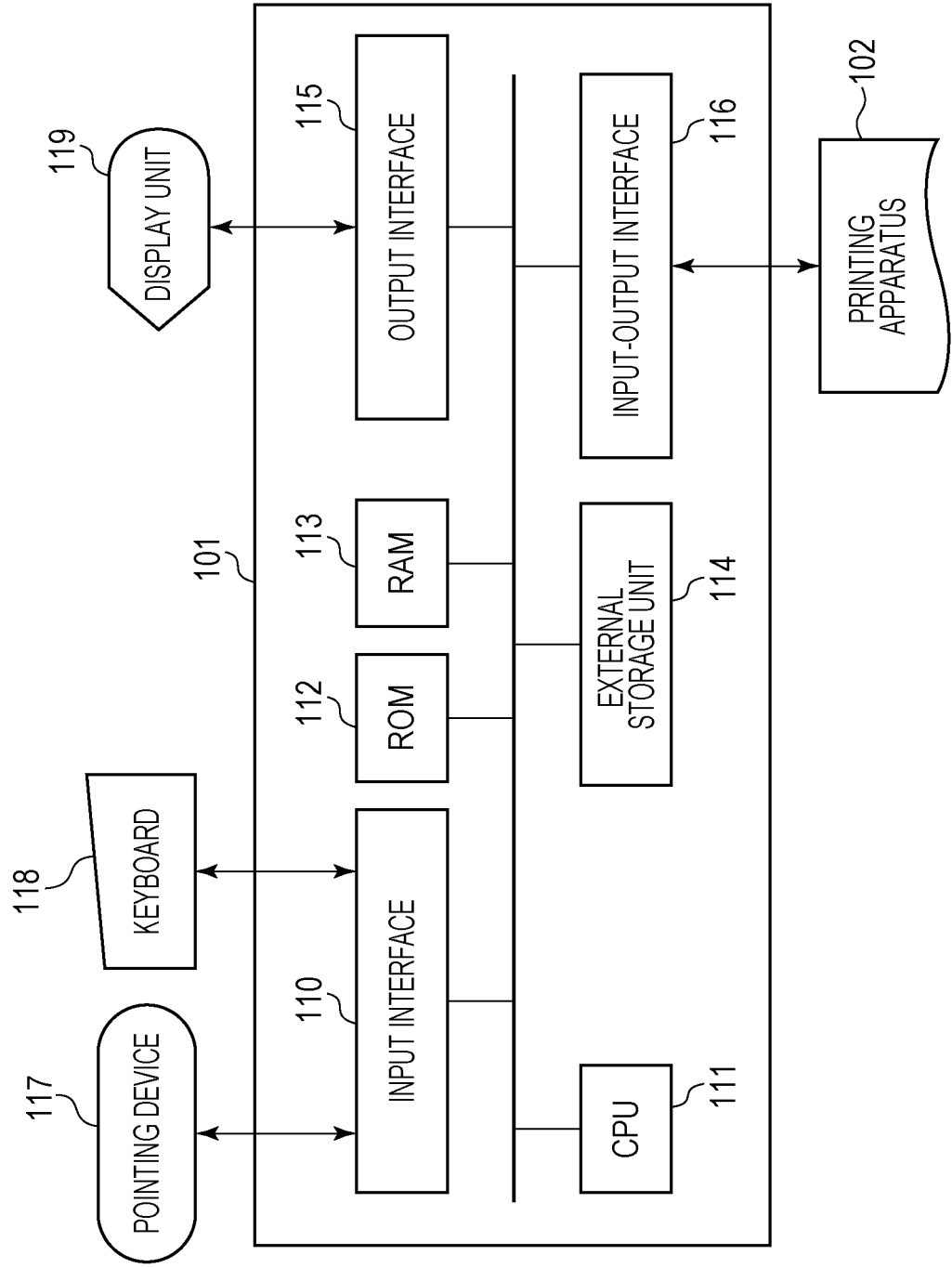

FIG. 3

| Basic settings | |
|---|---|
| Sheet type | Plain paper v |
| Sheet size | A4 v |
| Paper feed | Automatic v |
| Resolution | 600 × 600 v |

| Basic settings | |
|---|---|
| Orientation | ● Portrait   ○ Landscape |
| Borderless | Off |
| Printing in chapters | On |
| Duplex printing | Off v |
| Layout printing | Off v |
| Print preview | Off v |
| | OK |

FIG. 6

```
<psf:Feature name="psk:PageMediaType">
  <psf:Property name="psf:SelectionType">
    <psf:Value xsi:type="xsd:QName">psk:PickOne</psf:Value>
  </psf:Property>
  <psf:Property name="psk:DisplayName">
    <psf:Value xsi:type="xsd:string">Sheet type</psf:Value>
  </psf:Property>
  <psf:Option name="psk:Plain"constrained="psk:None">
    <psf:Property name="psk:DisplayName">
      <psf:Value xsi:type="xsd:string">Plain paper</psf:Value>
    </psf:Property>
  </psf:Option>
  <psf:Option name="ns0000:PhotoPaper"constrained="psk:None">
    <psf:Property name="psk:DisplayName">
      <psf:Value xsi:type="xsd:string">Photo paper</psf:Value>
    </psf:Property>
  </psf:Option>
</psf:Feature>

<psf:Feature name="psk:PageOrientation">
  <psf:Property name="psf:SelectionType">
    <psf:Value xsi:type="xsd:QName">psk:PickOne</psf:Value>
  </psf:Property>
  <psf:Property name="psk:DisplayName">
    <psf:Value xsi:type="xsd:string">Orientation of printing</psf:Value>
  </psf:Property>
  <psf:Option name="psk:Portrait"constrained="psk:None">
    <psf:Property name="psk:DisplayName">
      <psf:Value xsi:type="xsd:string">Portrait</psf:Value>
    </psf:Property>
  </psf:Option>
  <psf:Option name="psk:Landscape"constrained="psk:None">
    <psf:Property name="psk:DisplayName">
      <psf:Value xsi:type="xsd:string">Landscape</psf:Value>
    </psf:Property>
  </psf:Option>
</psf:Feature>
```
~601

```
<psf:Feature name="psk:PageMediaType">
  <psf:Option name="ns0000:PhotoPaper"/>
</psf:Feature>

<psf:Feature name="psk:PageOrientation">
  <psf:Option name="psk:Portrait"/>
</psf:Feature>
```
~602

FIG. 7

```
<psf:Feature name="psk:PageMediaType">
  <psf:Property name="psf:SelectionType">
    <psf:Value xsi:type="xsd:QName">psk:PickOne</psf:Value>
  </psf:Property>
  <psf:Property name="psk:DisplayName">
    <psf:Value xsi:type="xsd:string">Sheet type</psf:Value>
  </psf:Property>
  <psf:Option name="psk:Plain"constrained="psk:None">
    <psf:Property name="psk:DisplayName">
      <psf:Value xsi:type="xsd:string">Plain paper</psf:Value>
    </psf:Property>
  </psf:Option>
  <psf:Option name="ns0000:PhotoPaper"constrained="psk:None">
    <psf:Property name="psk:DisplayName">
      <psf:Value xsi:type="xsd:string">Photo paper</psf:Value>
    </psf:Property>
  </psf:Option>
</psf:Feature>

<psf:Feature name="psk:PageOrientation">
  <psf:Property name="psf:SelectionType">
    <psf:Value xsi:type="xsd:QName">psk:PickOne</psf:Value>
  </psf:Property>
  <psf:Property name="psk:DisplayName">
    <psf:Value xsi:type="xsd:string">Orientation of printing</psf:Value>
  </psf:Property>
  <psf:Option name="psk:Portrait"constrained="psk:None">
    <psf:Property name="psk:DisplayName">
      <psf:Value xsi:type="xsd:string">Portrait</psf:Value>
    </psf:Property>
  </psf:Option>
  <psf:Option name="psk:Landscape"constrained="psk:None">
    <psf:Property name="psk:DisplayName">
      <psf:Value xsi:type="xsd:string">Landscape</psf:Value>
    </psf:Property>
  </psf:Option>
</psf:Feature>

<psf:Feature name="psk:JobNUpAllDocumentsContiguously">
  <psf:Property name="psf:SelectionType">
    <psf:Value xsi:type="xsd:QName">psk:PickOne</psf:Value>
  </psf:Property>
  <psf:Property name="psk:DisplayName">
    <psf:Value xsi:type="xsd:string">Layout</psf:Value>
  </psf:Property>
  <psf:Option name="ns0000:None"constrained="psk:None">
    <psf:Property name="psk:DisplayName">
      <psf:Value xsi:type="xsd:string"> Off </psf:Value>
    </psf:Property>
    <psf:ScoredProperty name="psk:PagesPerSheet">
      <psf:Value xsi:type="xsd:integer">1</psf:Value>
    </psf:ScoredProperty>
  </psf:Option>
  <psf:Option name="ns0000:PagesSheet_2"constrained="psk:None">
    <psf:Property name="psk:DisplayName">
      <psf:Value xsi:type="xsd:string">2 in 1 printing </psf:Value>
    </psf:Property>
    <psf:ScoredProperty name="psk:PagesPerSheet">
      <psf:Value xsi:type="xsd:integer">2</psf:Value>
    </psf:ScoredProperty>
  </psf:Option>
</psf:Feature>
```
701

```
<psf:Feature name="psk:PageMediaType">
  <psf:Option name="ns0000:PhotoPaper"/>
</psf:Feature>

<psf:Feature name="psk:PageOrientation">
  <psf:Option name="psk:Portrait"/>
</psf:Feature>

<psf:Feature name="psk:JobNUpAllDocumentsContiguously">
  <psf:Option name="ns0000:PagesPerSheet_4">
    <psf:ScoredProperty name="psk:PagesPerSheet">
      <psf:Value xsi:type="xsd:integer">4</psf:Value>
    </psf:ScoredProperty>
  </psf:Option>
</psf:Feature>

<psf:Feature name="ns0000:JobPreview">
  <psf:Option name="ns0000:ON"/>
</psf:Feature>
```
702

FIG. 8

```
<psf:Feature name="psk:PageMediaType">
    <psf:Option name="ns0000:PhotoPaper"/>
</psf:Feature>

<psf:Feature name="psk:PageOrientation">
    <psf:Option name="psk:Portrait"/>
</psf:Feature>

<psf:Feature name="psk:JobNUpAllDocumentsContiguously">
    <psf:Option name="ns0000:None">
        <psf:ScoredProperty name="psk:PagesPerSheet">
            <psf:Value xsi:type="xsd:integer">1</psf:Value>
        </psf:ScoredProperty>
    </psf:Option>
</psf:Feature>
```

FIG. 9

```
<psf:Feature name="psk:PageMediaType">
   <psf:Option name="ns0000:PhotoPaper"/>
</psf:Feature>

<psf:Feature name="psk:PageOrientation">
   <psf:Option name="psk:Portrait"/>
</psf:Feature>

<paf:Parameter name="Extension">
   <psf:Feature name="psk:JobNUpAllDocumentsContiguously">
      <psf:Option name="ns0000:PagesPerSheet_4">
         <psf:ScoredProperty name="psk:PagesPerSheet">
            <psf:Value xsi:type="xsd:integer">4</psf:Value>
         </psf:ScoredProperty>
      </psf:Option>
   </psf:Feature>

<psf:Feature name="ns0000:JobPreview">
      <psf:Option name="ns0000:ON"/>
   </psf:Feature>
</psf:Parameter>
```

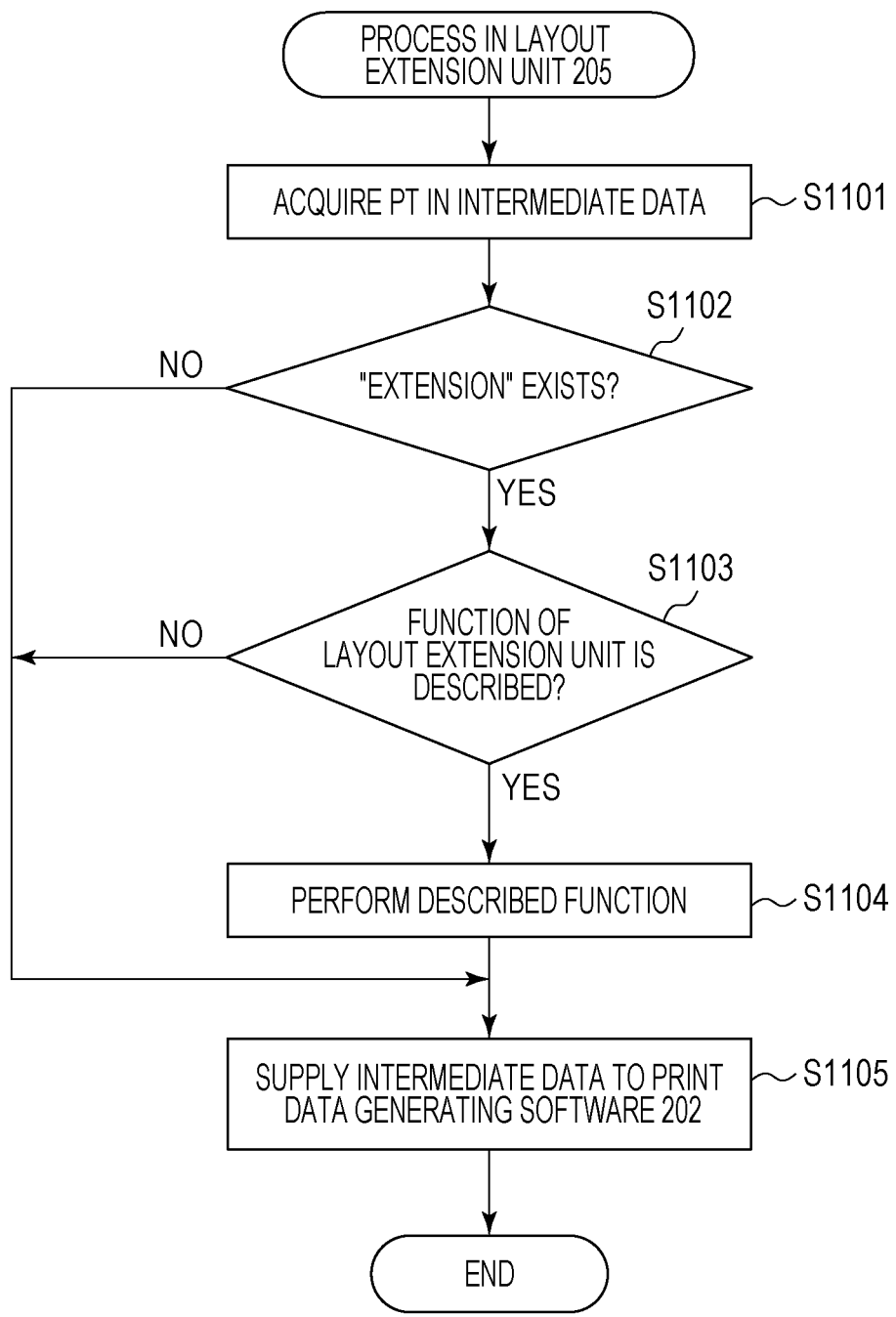

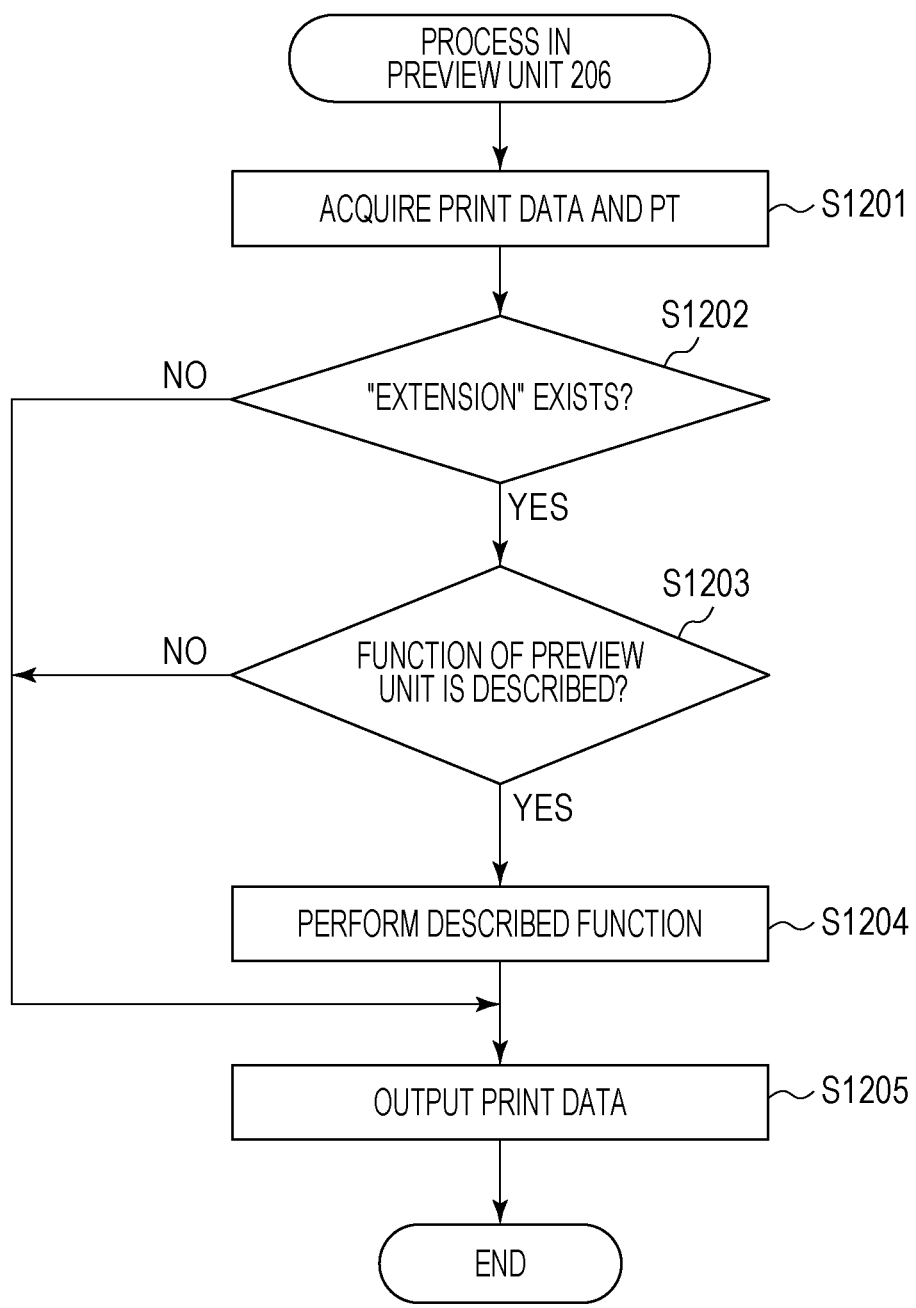

FIG. 13A

```
<psf:Feature name="psk:PageMediaType">
    <psf:Property name="psf:SelectionType">
        <psf:Value xsi:type="xsd:QName">psk:PickOne</psf:Value>
    </psf:Property>
    <psf:Property name="psk:DisplayName">
        <psf:Value xsi:type="xsd:string">Sheet type</psf:Value>
    </psf:Property>
    <psf:Option name="psk:Plain"constrained="psk:None">
        <psf:Property name="psk:DisplayName">
            <psf:Value xsi:type="xsd:string">Plain paper</psf:Value>
        </psf:Property>
    </psf:Option>
    <psf:Option name="ns0000:PhotoPaper"constrained="psk:None">
        <psf:Property name="psk:DisplayName">
            <psf:Value xsi:type="xsd:string">Photo paper</psf:Value>
        </psf:Property>
    </psf:Option>
</psf:Feature>

<psf:Feature name="psk:PageOrientation">
    <psf:Property name="psf:SelectionType">
        <psf:Value xsi:type="xsd:QName">psk:PickOne</psf:Value>
    </psf:Property>
    <psf:Property name="psk:DisplayName">
        <psf:Value xsi:type="xsd:string">Orientation of printing</psf:Value>
    </psf:Property>
    <psf:Option name="psk:Portrait"constrained="psk:None">
        <psf:Property name="psk:DisplayName">
            <psf:Value xsi:type="xsd:string">Portrait</psf:Value>
        </psf:Property>
    </psf:Option>
    <psf:Option name="psk:Landscape"constrained="psk:None">
        <psf:Property name="psk:DisplayName">
            <psf:Value xsi:type="xsd:string">Landscape</psf:Value>
        </psf:Property>
    </psf:Option>
</psf:Feature>
```

```
<psf:Feature name="psk:JobNUpAllDocumentsContiguously">
    <psf:Property name="psf:SelectionType">
        <psf:Value xsi:type="xsd:QName">psk:PickOne</psf:Value>
    </psf:Property>
    <psf:Property name="psk:DisplayName">
        <psf:Value xsi:type="xsd:string">Layout</psf:Value>
    </psf:Property>
    <psf:Option name="ns0000:None" constrained="psk:None">
        <psf:Property name="psk:DisplayName">
            <psf:Value xsi:type="xsd:string">Off</psf:Value>
        </psf:Property>
        <psf:ScoredProperty name="psk:PagesPerSheet">
            <psf:Value xsi:type="xsd:integer">1</psf:Value>
        </psf:ScoredProperty>
    </psf:Option>
    <psf:Option name="ns0000:PagesPerSheet_2" constrained="psk:None">
        <psf:Property name="psk:DisplayName">
            <psf:Value xsi:type="xsd:string">2 in 1 printing</psf:Value>
        </psf:Property>
        <psf:ScoredProperty name="psk:PagesPerSheet">
            <psf:Value xsi:type="xsd:integer">2</psf:Value>
        </psf:ScoredProperty>
    </psf:Option>
    <psf:Option name="ns0000:PagesPerSheet_4" constrained="psk:None">
        <psf:Property name="psk:DisplayName">
            <psf:Value xsi:type="xsd:string">4 in 1 printing</psf:Value>
        </psf:Property>
        <psf:ScoredProperty name="psk:PagesPerSheet">
            <psf:Value xsi:type="xsd:integer">4</psf:Value>
        </psf:ScoredProperty>
    </psf:Option>
</psf:Feature>

<psf:Feature name="ns0000:JobPreview">
    <psf:Property name="psf:SelectionType">
        <psf:Value xsi:type="xsd:Qname">psk:PickOne</psf:Value>
    </psf:Property>
    <psf:Property name="psk:DisplayName">
        <psf:Value xsi:type="xsd:string">Preview before printing</psf:Value>
    </psf:Property>
    <psf:Option name="ns0000:OFF" constrained="psk:None">
        <psf:Property name="psk:DisplayName">
            <psf:Value xsi:type="xsd:string">Off</psf:Value>
        </psf:Property>
    </psf:Option>
    <psf:Option name="ns0000:ON" constrained="psk:None">
        <psf:Property name="psk:DisplayName">
            <psf:Value xsi:type="xsd:string">On</psf:Value>
        </psf:Property>
    </psf:Option>
</psf:Feature>
```

INFORMATION PROCESSING APPARATUS AND CONTROL METHOD

BACKGROUND

Field of the Disclosure

The present disclosure relates to an information processing apparatus and a control method.

Description of the Related Art

Although print data generating software according to standard specifications has the advantage that users are capable of realizing printing without installing print data generating software specific to devices, the print data generating software is not capable of being optimally customized for the devices. In order to resolve the above problem, a mechanism is provided to extend the function of the print data generating software using extension applications specific to vendors. In Windows (registered trademark), an extension application called Windows Store Device App (WSDA) is provided as the extension application to extend functions which printer drivers do not have. Japanese Patent Laid-Open No. 2017-16480 discloses customization of a print settings screen in printing from a drawing application through provision of the WSDA by a vendor that provides a printing apparatus.

SUMMARY

According to an embodiment of the present disclosure, an information processing apparatus includes at least one processor and at least one memory storing print data generating software that is acquired at first timing and an extension application that is acquired at second timing different from the first timing, that is different from the print data generating software, and that, when executed by the at least one processor, causes the information processing apparatus to function as a generating unit that generates settings information based on information input on a settings screen provided by the extension application and a performing unit that performs an extended function provided by the extension application based on the generated settings information. Information regarding the extended function is processed so as not be edited by an operating system, and print data is generated based on the settings information by the print data generating software.

Further features of the present disclosure will become apparent from the following description of exemplary embodiments with reference to the attached drawings.

BRIEF DESCRIPTION OF THE DRAWINGS

FIG. 1 is a block diagram illustrating an exemplary hardware configuration of a printing system.

FIG. 3 is a schematic drawing for describing a screen on which print settings are made.

FIG. 6 illustrates examples of capability information that includes no extended function and print settings information.

FIG. 7 illustrates examples of capability information that includes extended functions and the print settings information.

FIG. 8 illustrates the print settings information after consistency check of the print settings is performed.

FIG. 9 illustrates an example of how the print settings information is described in a first embodiment.

FIG. 11 is a flowchart illustrating an exemplary process in a layout extension unit.

FIG. 12 is a flowchart illustrating an exemplary process in a preview unit.

FIG. 13A and FIG. 13B illustrate an example of how capability information is described in a second embodiment.

DESCRIPTION OF THE EMBODIMENTS

Figure 2A:
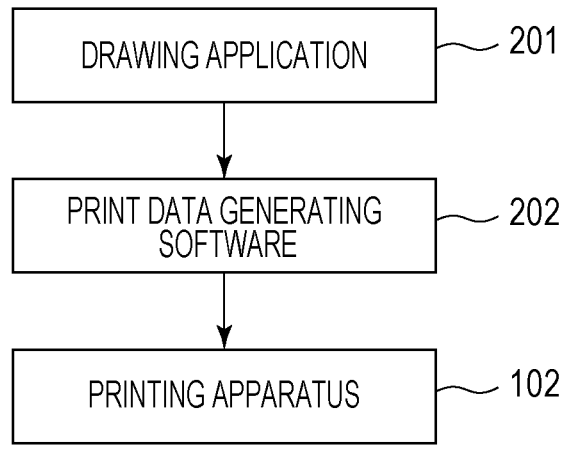
FIG. 2A and FIG. 2B are block diagrams for describing data flows in printing.

The WSDA in related art remains to have a limit on its function. In order to resolve this problem, embodiments of the present disclosure intend to provide better functions as the extension application of the print data generating software.

Embodiments of the present disclosure will herein be described in detail with reference to the drawings. The embodiments described below are not intended to limit the present disclosure according to the claims and all the combinations of features described in the embodiments are not necessarily essential to resolutions of the present disclosure. The same reference numerals are used in the following description to identify the same components and a description of such components is omitted herein.

First Embodiment

Hardware Configuration of Printing System

FIG. 1 a block diagram illustrating an exemplary hardware configuration of a printing system. Referring to FIG. 1, a host computer 101 is an example of an information processing apparatus and includes an input interface 110, a central processing unit (CPU) 111, a read only memory (ROM) 112, a random access memory (RAM) 113, an external storage unit 114, an output interface 115, and an input-output interface 116. Input devices, such as a keyboard 118 and a pointing device 117, are connected to the input interface 110. A display device, such as a display unit 119, is connected to the output interface 115.

An initialization program is stored in the ROM 112. An application program group including a drawing application, an operating system (OS), print data generating software, a variety of data are stored in the external storage unit 114. The RAM 113 is used as, for example, a working memory in execution of various programs stored in the external storage unit 114.

In a first embodiment, the CPU 111 performs processing in accordance with the procedures of programs stored in the ROM 112 to perform functions described below in the host computer 101 and processes according to flowcharts described below. A printing apparatus 102, which is a device, is connected to the host computer 101 via the input-output interface 116. Although the host computer 101 and the printing apparatus 102 are separately provided, the host computer 101 and the printing apparatus 102 may be integrated as one information processing apparatus. Although the printing apparatus is exemplified by an inkjet printer that performs printing by ejecting ink on sheets of paper, the printing may be performed using another method (for example, an electrophotographic method). The host computer 101 may be a desktop personal computer, a smartphone, or a notebook computer.

Necessity of Extension Application

The necessity of the extension application will now be described. In the related art, it is necessary for printer vendors to create a printer driver for each device (printing apparatus) and it is necessary for users to install the printer drivers appropriate for the devices. In contrast, generic drivers exist as the printer drivers capable of operating in multiple devices. In recent years, an OS vendor provides the generic driver according to standard specifications and a printer vendor that provides the printing apparatus manufactures the device (printing apparatus) according to standard specifications to enable the printing without installing the printer driver specific to the printer vendor. In addition, in an environment in which the printer driver is not capable of being installed (for example, a smartphone) in an increasing diversity of a printing environment, the printing may be performed using a print data generating application that generates print data according to standard specifications. The generic printer driver and the print data generating application are hereinafter referred to as "print data generating software."

Since such print data generating software conforms to the standard specifications, the print data generating software has the advantage that the user is capable of realizing the printing without installing the print data generating software specific to the device. However, the print data generating software is not capable of being optimally customized for the device. In particular, since the print data generating software provided with the OS has only minimal functions, the print data generating software provided with the OS is not capable of using the functions sufficient for utilizing the printing apparatus provided by the printer vendor. Accordingly, extended functions are provided using the extension application in the first embodiment. The extension application in the first embodiment is activated before a printing instruction is issued by the user to display a print settings screen. In addition, the extension application in the first embodiment is activated after the printing instruction is issued to provide functions including editing of print settings information and intermediate data and display of a user interface (UI). As described above, the extension application in the first embodiment has multiple functions including customization of the print settings screen and editing of the intermediate data and is activated multiple times at different timings, such as before the printing instruction is issued and after the printing instruction is issued. Accordingly, the extension application in the first embodiment is hereinafter also referred to as an integrated extension application. A processing flow in the first embodiment will be described below.

Data Flow in Printing

Figure 2B:
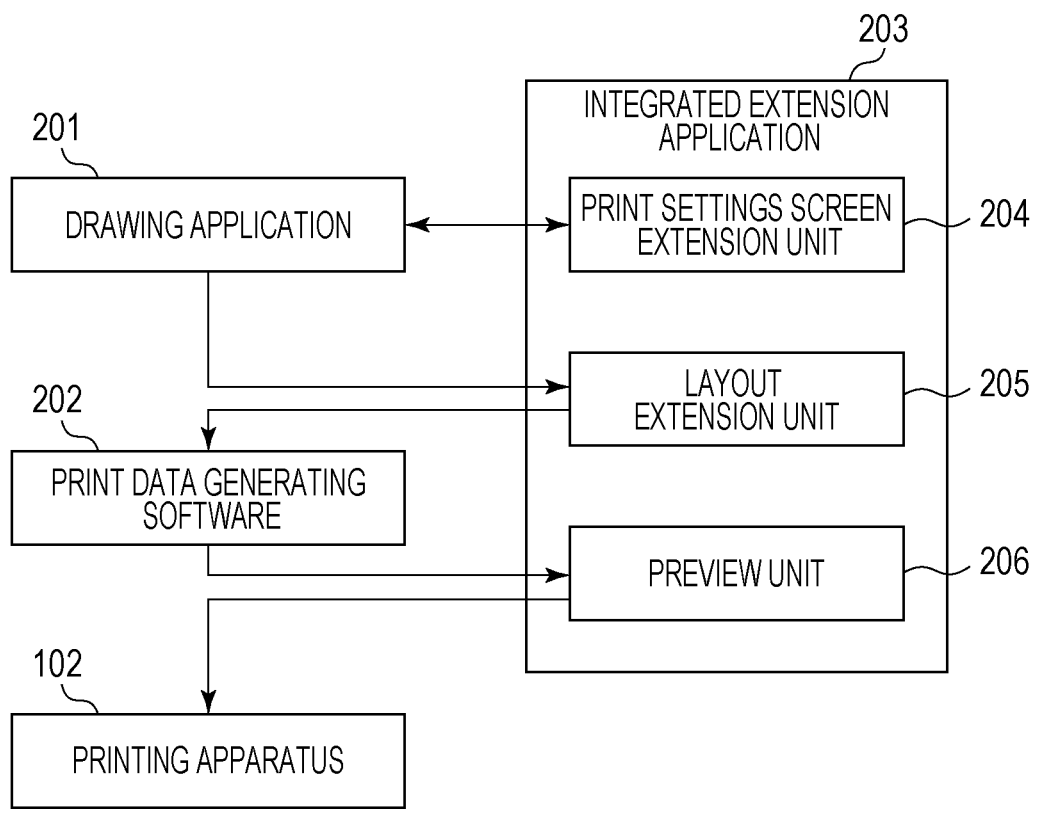

FIG. 2A and FIG. 2B are block diagrams for describing data flows in printing. FIG. 2A illustrates a data flow when an integrated extension application 203 is associated with none of a drawing application 201, a print data generating software 202, and the printing apparatus 102. The drawing application 201 is software to generate content data to be printed (drawing data, such as an image, text information, and so on, on which the printing on a sheet of paper is based) and is also referred to as a content creation application. The drawing application 201 corresponds to, for example, a document creating application, a spread sheet application, a presentation application, or the like.

In the instruction of the printing, the user inputs desired print settings using the print settings screen provided by the OS (not illustrated) or the print data generating software 202, which is displayed via a screen provided by the drawing application 201. Then, the user returns back to the screen provided by the drawing application 201 and instructs the printing using the screen provided by the drawing application 201. At this time, the drawing application 201 causes the OS to perform consistency check of the print settings using the function of the OS when the print settings screen is closed by the user or when the printing instruction is issued by the user.

Then, the OS generates the intermediate data (also referred to as input data) based on the drawing data generated by the drawing application 201 in response to the printing instruction from the user and supplies the generated intermediate data to the print data generating software 202. Here, the intermediate data is data of an Extensible Markup Language (XML) Paper Specification format (XPS format data). However, the intermediate data in the first embodiment may be data of a Graphics Device Interface format (GDI format data). Alternatively, the intermediate data may be data of another format other than the XPS format and the GDI format. The drawing application 201 itself may generate the intermediate data depending on the kind of the drawing application 201. In other words, the drawing application 201 may generate the intermediate data based on the drawing data and the generated intermediate data may be supplied to the print data generating software 202 via the OS. Alternatively, the OS may modify the intermediate data of the XPS format, generated by the drawing application 201, to newly generate the intermediate data of the XPS format.

The print data generating software 202 generates the print data (also referred to as a print command) which the printing apparatus is capable of interpreting based on the intermediate data and transmits the generated print data to the printing apparatus 102. The print data generating software 202 generates the print data usable for the printing apparatuses of multiple printer vendors. In other words, the printing is capable of being performed using the print data generated by the same print data generating software 202 for the printing apparatus of a vendor A and the printing apparatus of a vendor B. The printing apparatus 102 performs the printing on the sheet of paper based on the print data transmitted from the print data generating software 202.

FIG. 2B illustrates a data flow when the integrated extension application 203 is associated with the print data generating software 202. The print data generating software 202 in the first embodiment is software incorporated in the OS in advance. In other words, the print data generating software is capable of being used at a stage when the OS is installed in the host computer 101. In contrast, the integrated extension application 203 is software that is not incorporated in the OS in advance. In other words, the integrated extension application 203 is not installed at the stage when the OS is installed in the host computer 101. Accordingly, it is necessary for the user to download the integrated extension application 203 from a certain server via a network, such as the Internet, by operating the host computer 101 to install the downloaded integrated extension application 203. In addition, when the printing apparatus 102 is connected to the host computer 101, the CPU 111 may acquire device identification information about the printing apparatus 102 from the printing apparatus 102 and may acquire the integrated extension application 203 using the acquired device identification information. In other words, the integrated extension application 203 corresponding to the device identification information acquired from the printing apparatus 102 may be downloaded from a certain server via a network, such as the Internet, and the downloaded integrated extension application 203 may be installed.

As described above, the print data generating software 202 and the integrated extension application 203 are acquired at different timings and are held in separate files in the host computer 101. The print data generating software 202 and the integrated extension application 203 may be subjected to updating and version upgrade. However, these updating processes are also performed at different timings. When the integrated extension application 203 is installed, the OS associates the print data generating software 202 with the integrated extension application 203. The integrated extension application 203 may be associated with the printing apparatus 102. In particular, when the integrated extension application 203 is downloaded using the device identification information, the integrated extension application 203 and the printing apparatus 102 are associated with each other with the device identification information.

The integrated extension application 203 described in the first embodiment includes a print settings screen extension unit 204, a layout extension unit 205, and a preview unit 206. The print settings screen extension unit 204 provides the print settings screen on which the user inputs the print settings. The layout extension unit 205 performs a layout process to the intermediate data before being processed by the print data generating software 202. Specifically, the layout extension unit 205 provides a layout printing function (also referred to as an Nin1 function or an Nup function) to arrange multiple pages generated by the drawing application 201 on one sheet of paper for printing. For example, the layout extension unit 205 lines up pieces of data corresponding to two pages to lay out the pieces of data on one page. The preview unit 206 is capable of performing at least one of display and editing based on the print data generated by the print data generating software 202.

The operation of the integrated extension application 203 may be terminated each time the processing in each unit is completed. In this case, the OS activates the integrated extension application 203 each time a request to use each unit is received. Other modes may be adopted. For example, although the OS terminates the operation of the integrated extension application 203 when the process in the print settings screen extension unit 204 is completed, the OS may leave the integrated extension application 203 operated when the process in the layout extension unit 205 is completed.

Although each unit in the integrated extension application 203 is capable of displaying the UI, the UI may not be displayed. For example, in the case of the layout extension unit 205, only the editing of the intermediate data may be performed without displaying the UI and the edited intermediate data may be supplied to the print data generating software 202. When the layout extension unit 205 is capable of displaying the UI, for example, the layout extension unit 205 may display a print preview screen including a preview image and a control item for changing the print settings based on the intermediate data. The configuration of the integrated extension application 203 for realizing the embodiment of the present disclosure is not limited to the above one having all the above functions and the integrated extension application 203 may have a configuration having part of the functions or having other functions. As described above, the integrated extension application 203 has at least one of the function to display the print settings screen, the function to edit the intermediate data to be input into the print data generating software, and the function to display the print data.

In the instruction of the printing, the user first issues an instruction for inputting the print settings on the screen provided by the drawing application 201. The integrated extension application 203 is activated in response to this instruction to display the print settings screen provided by the print settings screen extension unit 204. The user inputs desired print settings using the print settings screen.

FIG. 3 illustrates an example of the print settings screen provided by the print settings screen extension unit 204 in the integrated extension application 203. When the integrated extension application 203 is not associated with the print data generating software 202, as in the case in FIG. 2A, the standard print settings screen provided by the OS or the print data generating software 202 is generally used. On the standard print settings screen, only the functions provided by the print data generating software 202 are capable of being set. In contrast, on the print settings screen provided by the integrated extension application 203, the extended functions provided by the integrated extension application 203 are also capable of being set. The extended functions are the functions which the print data generating software 202 does not have and indicate the functions which the integrated extension application 203 is capable of providing. In the example in FIG. 3, the setting of the layout printing provided by the layout extension unit 205 and the setting of a print preview function provided by the preview unit 206 are capable of being made. Specifically, the print settings screen provided by the integrated extension application 203 in the first embodiment includes a control item with which the layout printing is capable of being set and a control item with which display of the print preview screen is capable of being set as display items set with the extended functions. However, the integrated extension application 203 in the first embodiment is not limited to set the two extended functions and may be capable of setting, for example, a stamp function. In other words, a control item with which the stamp function or the like is capable of being set may be displayed on the print settings screen. The extended functions which the integrated extension application 203 is capable of providing is desirably determined when the integrated extension application 203 is installed. In this case, the extended functions which the integrated extension application 203 is capable of providing are determined depending on the kind of the host computer 101 or the printing apparatus 102 connected to the host computer 101. Alternatively, the extended functions which the integrated extension application 203 is capable of providing may be determined after the integrated extension application 203 is installed. In this case, the integrated extension application 203 communicates with the printing apparatus 102 connected to the host computer 101 to determine the extended functions which the integrated extension application 203 is capable of providing depending on the kind of the printing apparatus 102 and the provided functions. Specifically, information about at least one of the kind of the printing apparatus 102 and the provided functions is acquired to determine the extended functions which the integrated extension application 203 is capable of providing.

The drawing application 201 acquires default print settings information (information indicating the print settings) generated by the OS and supplies the print settings information to the print settings screen extension unit 204 at activation of the print settings screen extension unit 204. The print settings screen extension unit 204 edits the acquired print settings information when the print settings screen is closed in response to an instruction from the user or when changing of the print setting is instructed on the print settings screen. Specifically, the print settings screen extension unit 204 edits the acquired print settings information based on input information input by the user on the print settings screen to newly generate the print settings information (information indicating the print settings). The generation of the print settings information will be described in detail below with reference to FIG. 10. The print settings information is included in data called PrintTicket, which is described in the XML format based on the format defined by the OS. The print settings information in the first embodiment is not limited to PrintTicket (may be hereinafter represented as "PT") and may have another format. The print settings screen extension unit 204 may acquire the default print settings information generated by the OS and may reflect the input information from the user in the default print settings information to newly generate (edit) the print settings information. The print settings screen extension unit 204 returns back the generated PT to the drawing application 201.

Then, the drawing application 201 requests the OS to perform the consistency check of the PT using the function of the OS. In other words, the OS performs the consistency check of the PT based on the instruction from the drawing application 201. The consistency check will be described below with reference to FIG. 6 to FIG. 9.

After the consistency check, the OS returns back the PT to the drawing application 201. The OS generates the intermediate data based on the printing instruction in response to the printing instruction from the user on the screen provided by the drawing application 201. The OS activates the layout extension unit 205 in the integrated extension application 203. The intermediate data in the first embodiment includes the drawing data generated by the drawing application 201 and the PT, which is the print settings information. The intermediate data is data of the XML Paper Specification format (XPS format data). However, the intermediate data in the first embodiment may be data of the Graphics Device Interface format (GDI format data). Alternatively, the intermediate data may be data of another format other than the XPS format and the GDI format. The drawing application 201 itself may generate the intermediate data depending on the kind of the drawing application 201. Specifically, the drawing application 201 may generate the intermediate data based on the drawing data and the generated intermediate data may be supplied to the print data generating software 202 via the OS. Alternatively, the OS may modify the intermediate data of the XPS format, generated by the drawing application 201, to newly generate the intermediate data of the XPS format.

Figure 4:
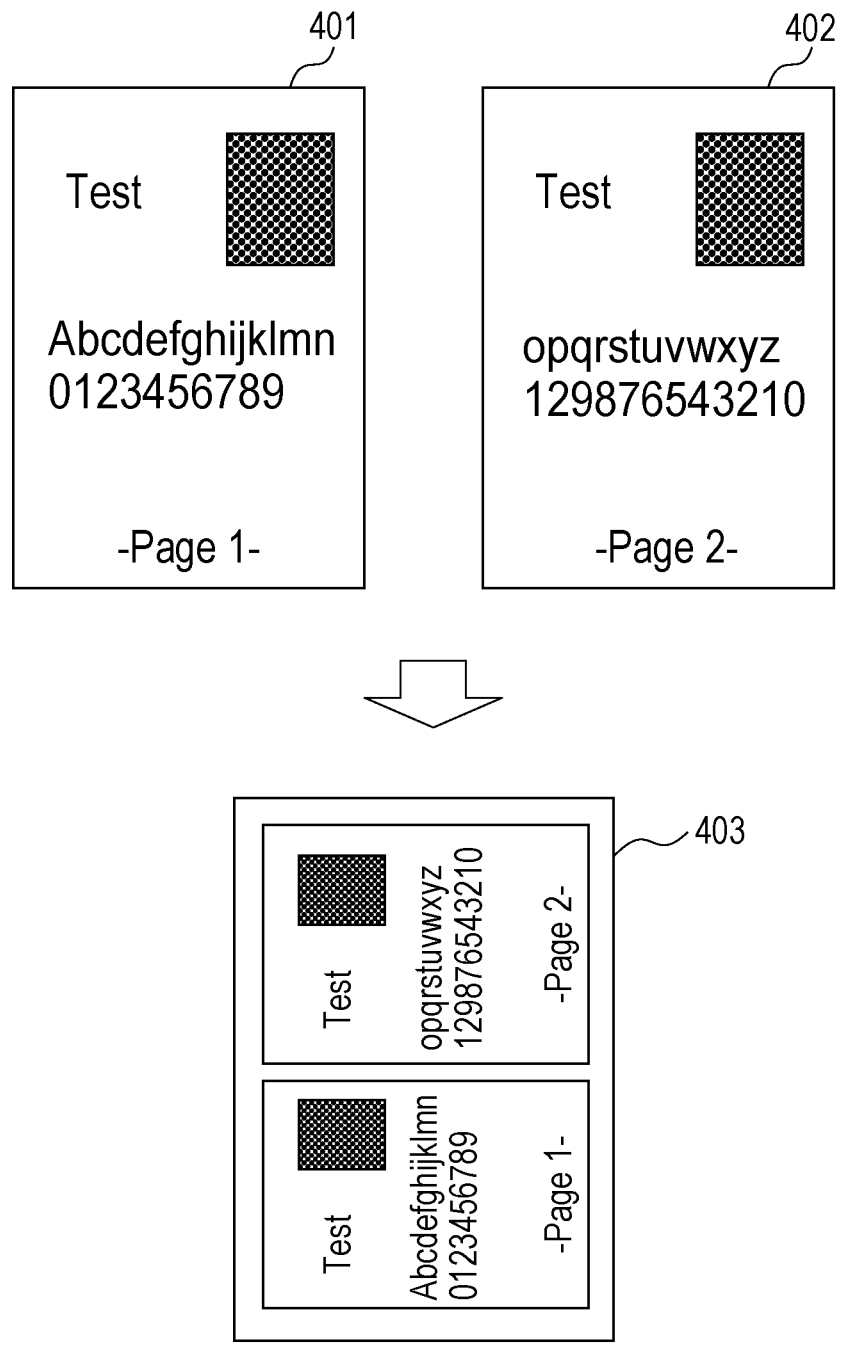
FIG. 4 is a schematic drawing for describing layout printing.

The layout extension unit 205 acquires the generated intermediate data and edits the intermediate data based on the PT in the intermediate data. FIG. 4 schematically illustrates the layout printing function, which is provided by the layout extension unit 205 in the integrated extension application 203. In the layout printing, the layout is performed so as to arrange multiple pages in the print data on one sheet of paper. In the example in FIG. 4, two-page print is set and the layout extension unit 205 generates data 403 in which two continuous pages 401 and 402 are arranged in one page. In the first embodiment, for simplicity, the layout extension unit 205 is described to have only layout functions of the two-page print and four-page print as the layout printing functions. However, a setting is practically available in which much more pages are arranged on one sheet of paper.

The editing of the intermediate data in the layout extension unit 205 will be described in detail below with reference to FIG. 11. The layout extension unit 205 supplies the edited intermediate data to the print data generating software 202.

The print data generating software 202 performs processing for functions other than the extended functions (functions which the print data generating software 202 is capable of providing) based on the PT in the acquired intermediate data. The print data generating software 202 generates the print data (also referred to as the print command) of the format which the printing apparatus is capable of interpreting. The print data generating software 202 generates the print data usable for the printing apparatuses of multiple printer vendors. In other words, the printing is capable of being performed using the print data generated by the same print data generating software 202 for the printing apparatus of the vendor A and the printing apparatus of the vendor B.

The print data generating software 202 outputs the generated print data and the PT in the intermediate data acquired from the layout extension unit 205. Then, the OS activates the preview unit 206 in the integrated extension application 203.

Figure 5:
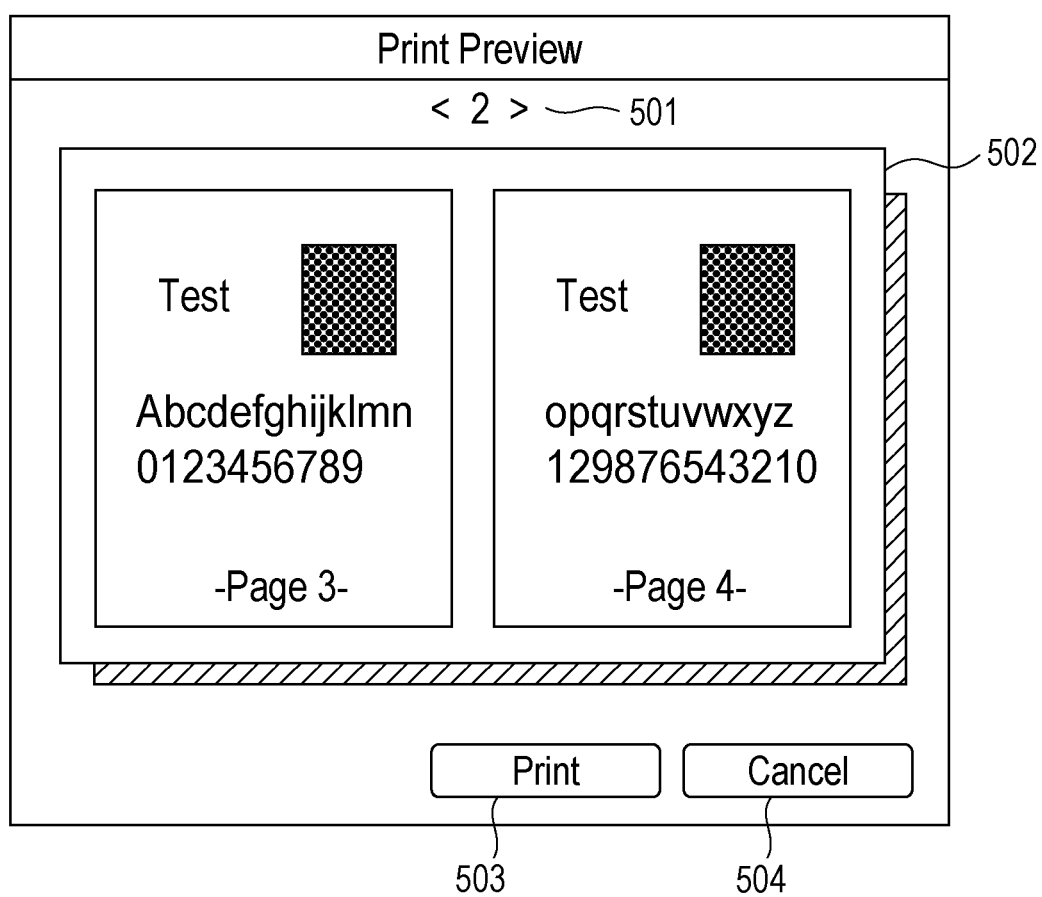
FIG. 5 is a schematic drawing of a user interface of a print preview function.

The preview unit 206 acquires the print data generated by the print data generating software 202 and the PT and displays the print preview. The user instructs start of printing on the UI screen of the print preview after confirming that a desired print result is achieved using the print preview. FIG. 5 illustrates an example of the print preview screen, provided by the preview unit 206 in the integrated extension application 203. Referring to FIG. 5, a display item 501 is a control item for changing the page to be displayed on the print preview. The user is capable of changing the page to be displayed using this control item. In addition, the user is capable of confirming the current print data and the total number of pages occurring in the print setup. A display item 502 is the print preview screen indicating the image of the print result of the page that is specified. A display item 503 is a Print button used to start the printing. A display item 504 is a Cancel button. Upon depression of this button by the user, the subsequent printing process is cancelled. On the screen in FIG. 5, a control item for changing the print settings may be displayed with the print preview screen. For example, control items with which the respective settings (the orientation of printing, a borderless printing setting, a duplex printing setting, a layout printing setting, and so on) illustrated in FIG. 3 are capable of being changed may be displayed. The process in the preview unit 206 will be described in detail below with reference to FIG. 12. The preview unit 206 accepts a print start instruction from the user and outputs the print data.

The print data output from the preview unit 206 is transmitted to the printing apparatus 102. The printing apparatus 102 performs the printing on the sheet of paper based on the print data transmitted from the print data generating software 202. With the above configuration, the user is capable of using the layout functions and the print preview function, which the print data generating software 202 does not have, with the integrated extension application 203. The outline of the printing flow in the first embodiment is described above. Each process in the printing flow will now be described in detail.

Process in Print Settings Screen Extension Unit 204

Figure 10:
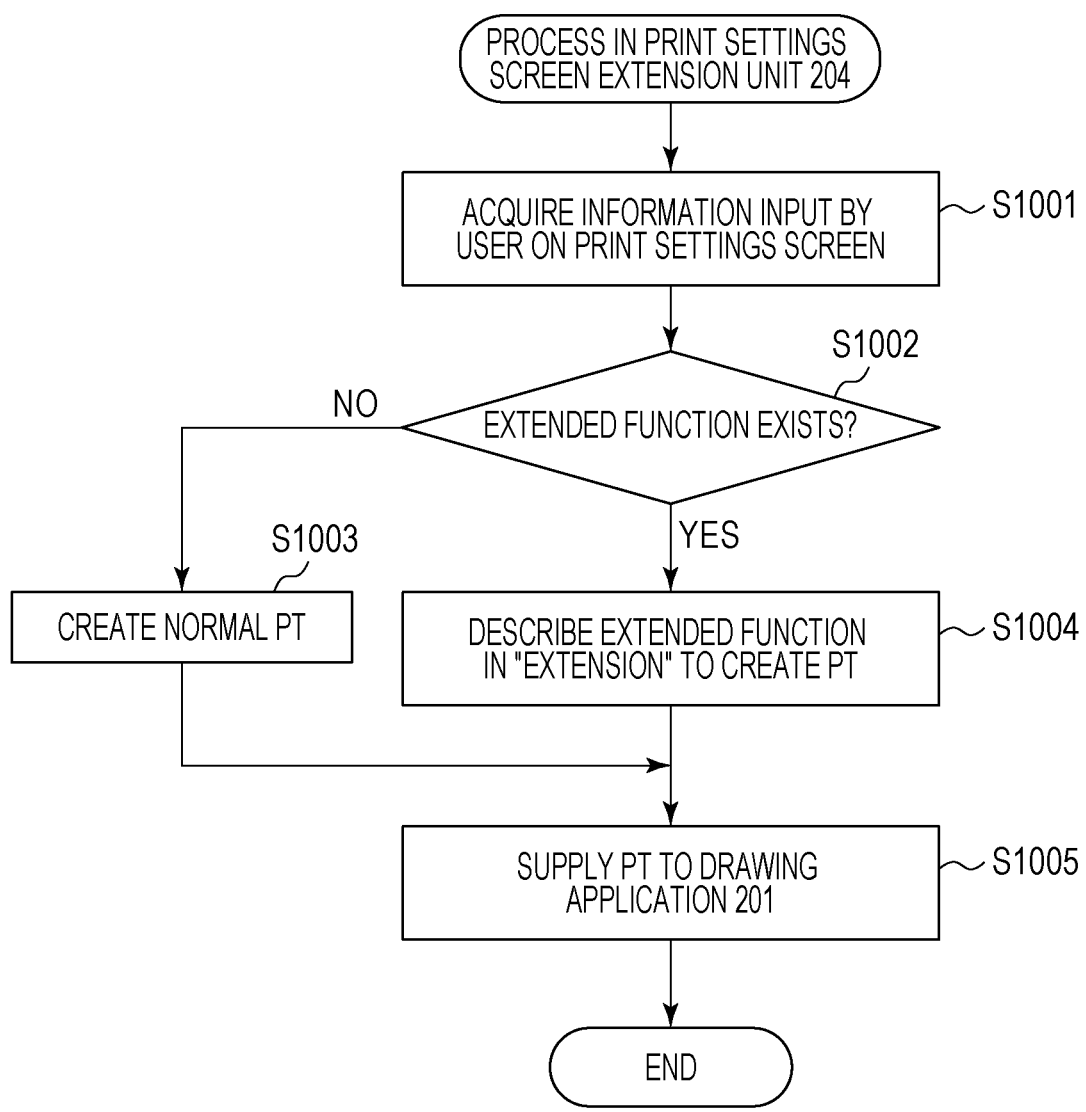
FIG. 10 is a flowchart illustrating an exemplary process performed by a print settings screen extension unit.

The generation of the print settings information in the print settings screen extension unit 204 will now be described in detail with reference to FIG. 10. FIG. 10 is a flowchart illustrating an exemplary process performed by the print settings screen extension unit 204. Although the print settings screen extension unit 204 may be hereinafter described as the subject of each process, the CPU 111 practically executes the corresponding program (the integrated extension application 203) to realize the corresponding function. All the steps are not necessarily sequentially performed on one process and the process may be moved to the OS side to be invoked again from the OS. The flowchart in FIG. 10 conveniently and simply indicates the main steps in the integrated extension application 203.

First, the print settings screen extension unit 204 displays the print settings screen illustrated in FIG. 3 in response to a user's instruction on the screen provided by the drawing application 201. On the print settings screen provided by the print settings screen extension unit 204, setting of the extended functions provided by the integrated extension application 203 is also available.

In Step S1001, the print settings screen extension unit 204 acquires the input information input by the user on the print settings screen. In Step S1002, the print settings screen extension unit 204 determines whether the integrated extension application 203 provides the functions (that is, the extended functions) other than the standard functions provided by the print data generating software 202. The extended functions include not only extension of setting items but also extension of the standard setting items the options of which are extended. The options are capable of being selected as the setting items. If the print settings screen extension unit 204 determines that the integrated extension application 203 provides the extended functions (YES in Step S1002), the process goes to Step S1004. If the print settings screen extension unit 204 determines that the integrated extension application 203 does not provide the extended functions (NO in Step S1002), the process goes to Step S1003.

In order to describe the extended functions, the functions (standard setting functions) provided by the print data generating software 202 will now be described with reference to FIG. 6. Referring to FIG. 6, capability information 601 is an example of the capability information indicating the functions of the print data generating software 202. The functions which the print data generating software 202 is capable of setting are described in the XML format based on the format defined by the OS in the capability information 601. The capability information 601 is called PrintCapabilities (may be hereinafter represented as "PC"). The print settings screen extension unit 204 provides the print settings screen based on the information described in the PC. It is assumed here that the print data generating software 202 has the functions of a sheet type and the orientation of printing as the setting items of the standard setting functions. Specifically, the sheet type setting (corresponding to the item in which "MediaType" is described in "Feature") and the orientation of printing setting (corresponding to the item in which "Orientation" is described in "Feature") are included in the PC. In addition, the print data generating software 202 includes Plain paper ("Option" in which "Plain" is described) and Photo paper ("Option in which "PhotoPaper" is described) as the options corresponding to the setting items of the sheet type. The print data generating software 202 includes Portrait ("Option" in which "Portrait" is described) and Landscape ("Option" in which "Landscape" is described) as the options corresponding to the setting items of the orientation of printing. Although the standard setting functions (for example, a sheet size setting) other than the above two functions are also practically included as the standard setting functions of the print data generating software 202, the standard setting functions other than the above two functions are omitted herein for simplicity.

If the determination in Step S1002 is negative, the integrated extension application 203 does not provide the extended functions. In other words, it means that settings other than the functions described in the capability information 601 in FIG. 6 (that is, the settings of the extended functions) do not exist. In this case, in Step S1003, the print settings screen extension unit 204 creates the normal PT, as illustrated in print settings information 602 in FIG. 6. Specifically, the items set for the sheet type and the orientation of printing, which are the standard setting functions, are input in the PT. In the print settings information 602 in FIG. 6, the PT is indicated in which "PhotoPaper" is set as the sheet type and "Portrait" is set as the orientation of printing.

If the determination in Step S1002 is affirmative, the integrated extension application 203 provides the extended functions. In other words, it means that the settings other than the functions described in the capability information 601 in FIG. 6 (that is, the settings of the extended functions) exist. In this case, in Step S1004, the print settings screen extension unit 204 creates the PT illustrated in FIG. 9. Specifically, Parameter "Extension" is provided and the extended functions are described in Parameter "Extension." Specifically, as illustrated in FIG. 9, the setting item (Feature of JobNUpAllDocumentsContiguously) of the layout printing function, which is the extended function, and a 4in1 setting (Option of PagesPerSheet_4), which is an option of the layout printing function, are described in "Extension." In addition, the setting item (Feature of JobPreview) of the print preview function, which is also the extended function, and an ON setting, which is an option of the print preview function, are described in "Extension." The setting functions other than the extended functions (the standard setting functions) are normally described, as in FIG. 6.

In Step S1005, the print settings screen extension unit 204 supplies the PT generated in Step S1003 or Step S1004 to the drawing application 201.

Although the print settings screen extension unit 204 determines whether the integrated extension application 203 provides the extended functions in Step S1002 in the above example, the first embodiment is not limited to this. For example, the print settings screen extension unit 204 may determine whether information about any extended function is included in the input information acquired in Step S1001. In this case, if the information about any extended function is included in the input information in Step S1002, the process goes to Step S1004. If the information about any extended function is not included in the acquired input information in Step S1002, the process goes to Step S1003.

Consistency Check of Print Settings

The consistency check of the print settings, which is performed after Step S1005, will now be described. The drawing application 201, which has acquired the PT, performs the consistency check of the print settings from the capability information of the print data generating software 202 and the print settings information using the function of the OS. Specifically, upon acceptance of the instruction from the drawing application 201, the OS checks whether information about the setting function that does not exist in the PC is included in the PT with reference to the information described in the PT. If the information about the setting function that does not exist in the PC is described in the PT, the OS deletes the information about the setting function from the PT or changes the information about the setting function to an appropriate setting value that exists in the PC.

The deletion or the changing is performed because the setting values other than the functions which the print data generating software 202 is capable of processing are determined to be incorrect values.

For example, a case is described in which the print data generating software 202 has the PC indicated in the capability information 601 in FIG. 6 and the PT indicated in the print settings information 602 in FIG. 6 is created in Step S1003. In this case, all the setting values existing in the PT in the print settings information 602 exist in the PC in the capability information 601. Accordingly, the OS does not change the capability information 601 in this case.

In contrast, a case is described as a comparative example in which the print data generating software 202 has the PC indicated in capability information 701 in FIG. 7 and the PT indicated in print settings information 702 in FIG. 7 is created. In this case, the 4in1 setting to lay out the data corresponding to four pages in one page is set as the layout printing function and the print preview function is set to effective (ON) in the PT indicated in the print settings information 702. However, the setting item (Feature of JobPreview) of the print preview function does not exist in the PC indicated in the capability information 701. In addition, although the setting item (Feature of JobNUpAllDocumentsContiguously) of the layout printing function exists in the PC indicated in the capability information 701, the 4in1 setting (Option of PagesPerSheet_4) does not exist as the option in the PC indicated in the capability information 701. In such a case, the OS changes Option in the layout printing function (Feature of JobNUpAllDocumentsContiguously) in the PT to None. In addition, the OS deletes the setting item (Feature of JobPreview) of the print preview function in the PT. As a result, the print settings information 702 is changed to print settings information (PT) illustrated in FIG. 8 through the consistency check. Although the OS changes Option in the layout printing function (Feature of JobNUpAllDocumentsContiguously) in the PT to None in FIG. 8, the first embodiment is not limited to this. For example, the OS may change Option in the layout printing function (Feature of JobNUpAllDocumentsContiguously) in the PT to another setting value existing in the PC (for example, "PagesPerSheet_2").

As described above, when the editing (change or deletion) of the setting value in the PC is performed by the OS in the consistency check, the print settings information is not correctly held through the consistency check even when the extended functions are added by the integrated extension application 203. As a result, the print settings information may not be correctly passed to the layout extension unit 205 and the preview unit 206.

In order to resolve the above problem, in the first embodiment, Parameter the setting value of which is not changed in the consistency check of the print settings is provided in the PT, which is the print settings information, as described above in Step S1004 in FIG. 10. Then, as illustrated in FIG. 9, the print settings screen extension unit 204 describes the extended functions in Parameter "Extension" and normally describes the other settings to create the PT, which is the print settings information. Accordingly, the OS operates so as not to change the setting values described in Parameter "Extension" even when the consistency check of the print settings is performed.

The parameter name "Extension" is an example of the parameter name the print setting of which is not changed by the OS and another parameter name may be used as long as the setting value of the parameter name is not changed in the consistency check of the print settings.

After the consistency check, the OS returns back the PT to the drawing application 201. Upon issuance of the printing instruction from the user on the screen provided by the drawing application 201, the OS generates the intermediate data based on the printing instruction. In addition, the OS activates the layout extension unit 205 in the integrated extension application 203.

Process in Layout Extension Unit 205

The process in the layout extension unit 205 will now be described with reference to FIG. 11. FIG. 11 is a flowchart illustrating an exemplary process in the layout extension unit 205. Although the layout extension unit 205 may be hereinafter described as the subject of each process, the CPU 111 practically executes the corresponding program (the integrated extension application 203) to realize the corresponding function. All the steps are not necessarily sequentially performed on one process and the process may be moved to the OS side to be invoked again from the OS. The flowchart in FIG. 11 conveniently and simply indicates the main steps in the integrated extension application 203.

Referring to FIG. 11, in Step S1101, the layout extension unit 205 acquires the intermediate data. In Step S1102, the layout extension unit 205 determines whether Parameter "Extension" exists in the PT in the intermediate data. If Parameter "Extension" does not exist in the PT in the intermediate data (NO in Step S1102), the process goes to Step S1105. If Parameter "Extension" exists in the PT in the intermediate data (YES in Step S1102), the process goes to Step S1103.

In Step S1103, the layout extension unit 205 determines whether the extended function described in Parameter "Extension" is the function of the layout extension unit 205 itself. In the case of the PT illustrated in FIG. 9, the layout printing setting, which is the function of the layout extension unit 205, is described in Parameter "Extension" (YES in Step S1103). Accordingly, the process goes to Step S1104. If the function of the layout extension unit 205 is not described in Parameter "Extension" (NO in Step S1103), the process goes to Step S1105.

In Step S1104, the layout extension unit 205 performs the described extended function. Specifically, in the case of the PT illustrated in FIG. 9, the layout extension unit 205 lays out the data corresponding to four pages on one page. This corresponds to the editing of the drawing data in the intermediate data by the layout extension unit 205. In Step S1105, the layout extension unit 205 supplies the edited intermediate data (including the edited drawing data and the PT) to the print data generating software 202.

After the process illustrated in FIG. 11, the print data generating software 202 performs the processing for the functions other than the extended functions (the functions which the print data generating software 202 is capable of providing) based on the PT in the acquired intermediate data. Then, the print data generating software 202 generates the print data (also referred to as the print command) of the format which the printing apparatus is capable of interpreting. Then, the print data generating software 202 outputs the generated print data and the PT in the intermediate data acquired from the layout extension unit 205. The OS activates the preview unit 206 in the integrated extension application 203.

Processing in Preview Unit 206

The process in the preview unit 206 will now be described with reference to FIG. 12. FIG. 12 is a flowchart illustrating an exemplary process in the preview unit 206. Although the preview unit 206 may be hereinafter described as the subject of each process, the CPU 111 practically executes the corresponding program (the integrated extension application 203) to realize the corresponding function. All the steps are not necessarily sequentially performed on one process and the process may be moved to the OS side to be invoked again from the OS. The flowchart in FIG. 12 conveniently and simply indicates the main steps in the integrated extension application 203.

Referring to FIG. 12, in Step S1201, the preview unit 206 acquires the print data generated by the print data generating software 202 and the PT.

In Step S1202, the preview unit 206 determines whether Parameter "Extension" exists in the acquired PT. If Parameter "Extension" does not exist in the acquired PT (NO in Step S1202), the process goes to Step S1205. If Parameter "Extension" exists in the acquired PT (YES in Step S1202), the process goes to Step S1203.

In Step S1203, the preview unit 206 determines whether the extended function described in Parameter "Extension" is the function of the preview unit 206 itself. In the case of the PT in FIG. 9, the print preview, which is the function of the preview unit 206, is described in Parameter "Extension" (YES in Step S1203). Accordingly, the process goes to Step S1204. If the function of the preview unit 206 is not described in Parameter "Extension" (NO in Step S1203), the process goes to Step S1205.

In Step S1204, the preview unit 206 performs the described extended function. Specifically, in the case of the PT in FIG. 9, the preview unit 206 performs a print preview process. The print preview screen including the preview image based on the acquired print data is displayed in the print preview process. For example, the print preview screen illustrated in FIG. 5 is displayed. A control item with which the print setting is capable of being changed may be displayed on the print preview screen with the preview image.

Upon issuance of the printing instruction with the Print button or the like provided on the print preview screen, in Step S1205, the preview unit 206 outputs the print data. The output print data is transmitted to the printing apparatus 102.

When the print setting is changed in response to a user's operation with the control item which is displayed with the preview image and with which the print setting is capable of being changed, the preview unit 206 may edit the print data based on the content of the change. Then, the preview unit 206 may perform the print preview process again based on the edited print data.

As described above, the integrated extension application 203 in the first embodiment is capable of providing the print settings screen and generates the print settings information based on an input on the print settings screen. In the generation of the print settings information, the settings information concerning the extended functions is described so that the editing (change or deletion) is not performed in the consistency check performed by the OS. This enables the integrated extension application 203, which is activated multiple times at different timings, to appropriately acquire the settings information concerning the extended function set for each print job at the subsequent activation timing.

Although the settings information concerning the extended functions is described in the print settings information by adding Parameter, which is not edited, in the above example, the first embodiment is not limited to this. The settings information concerning the extended functions may be stored using another method. For example, the print settings screen extension unit 204 may describe only a specific identifier for identifying the print job in the print settings information. The print settings screen extension unit 204 may store information indicating the actual print settings in an external file different from the print settings information with the identifier. When the identifier is stored in the print settings information, the integrated extension application 203 and the preview unit 206, which are subsequently activated, may refer to the external file having the same identifier to read out information concerning the print settings. The external file is a file which each unit in the integrated extension application 203 is capable of accessing and may be a file called UserPropertyBag or a file called QueuePropertyBag. The external file may be described in in a text file or the like and may be stored in a location which the normal user does not access.

Alternatively, the print settings screen extension unit 204 may store the print settings not in the external file but in a registry (a database of the settings information, provided by the OS) and may realize a process similar to that in the use of the external file. As described above, also when the external file or the registry is used, the information concerning the print settings stored in such a location is not edited by the OS even if the consistency check of the print settings information is performed. Accordingly, the integrated extension application 203 is capable of appropriately acquiring the settings information concerning the extended functions at the subsequent activation timing.

Second Embodiment

In the first embodiment, the print settings screen extension unit 204 appropriately extends the print settings information to enable the settings to be delivered to the extension application, which is subsequently activated. However, the functions that are capable of being realized in the integrated extension application 203 are not included in the capability information of the print data generating software 202 in the configuration of the first embodiment. Accordingly, the drawing application 201 may consider the functions that are capable of being practically realized in the print data generating software 202 not to be capable of being realized.

Some applications display part of the print settings on their own UIs and cause the users to select the print settings. The configuration of the first embodiment is not desired in such an application because only the functions described as the capability information of the print data generating software are generally controlled so as to be displayed on the UI. Accordingly, the functions that are practically operating may not be provided to the users. A second embodiment is provided to resolve this problem while returning back the correct capability information of the print data generating software 202 to the drawing application 201.

In the second embodiment, when the integrated extension application 203 is installed, the capability information (PC) of the print data generating software 202 is extended. Specifically, when the integrated extension application 203 described in the first embodiment is installed in association with the print data generating software 202 having the capability information, such as the capability information 701 in FIG. 7, the capability information is normally extended in a manner illustrated in FIG. 13A and FIG. 13B. The extension of the capability information is performed by the OS. Specifically, in response to a request to acquire the capability information from the drawing application 201 or the like, the OS adds the capability information indicating the functions of the integrated extension application 203 to the capability information indicating the functions of the print data generating software 202 and transmits the capability information resulting from the addition. For example, when the drawing application 201 or the like displays the UI for the print settings, it is necessary to acquire the capability information. Accordingly, in such a case, the drawing application 201 or the like submits the request to acquire the capability information and the OS transmits the capability information to the drawing application 201 or the like from which the request is submitted.

In the capability information illustrated in FIG. 13A and FIG. 13B, the OS adds the capability information indicating the four-page layout printing function and the print preview function of the integrated extension application 203 to the capability information of the print data generating software 202. Since the capability information is extended, the print settings concerning the extended functions are not deleted even when the drawing application 201 performs the consistency check of the print settings. Accordingly, the OS performs the addition of the capability information when the integrated extension application 203 is installed and does not perform the addition of the capability information when the integrated extension application 203 is not installed. A dedicated application programming interface (API) may be provided or the capability information may be described in the registry or the external file in order for the integrated extension application 203 to deliver the capability information to the OS.

With the above process, the settings information concerning the extended function set for each print job is capable of being acquired by the extension application that is activated at subsequent timing while the correct capability information of the print data generating software 202 is being returning back to the drawing application 201.

In the second embodiment, the print settings screen extension unit 204 in the integrated extension application 203 operates such that the integrated extension application 203 does not provide the extended functions. Specifically, the print settings screen extension unit 204 constantly determines that the integrated extension application 203 does not provide the extended functions in Step S1002 in FIG. 10. Then, in Step S1003, the print settings screen extension unit 204 creates the normal PT. In the second embodiment, it is not necessary for the layout extension unit 205 and the preview unit 206 in the integrated extension application 203 to confirm whether Parameter "Extension" exists in the PT. Specifically, it is not necessary to perform Step S1102 in FIG. 11 and Step 1202 in FIG. 12. The process in FIG. 11 skips Step S1102 and, in Step S1103, the layout extension unit 205 determines whether the function of the layout extension unit 205 is described in the PT. The process in FIG. 12 skips Step S1202 and, in Step S1203, the preview unit 206 determines whether the function of the preview unit 206 is described in the PT. The subsequent steps are the same as those in the first embodiment.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to provide better functions as the extension application of the print data generating software.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2018-128371, filed on Jul. 5, 2018, which is hereby incorporated by reference herein in its entirety.

What is claimed is:

1. An information processing apparatus comprising:
at least one processor; and
at least one memory storing print data generating software that is acquired at first timing and an extension application that is acquired at second timing different from the first timing, that is different from the print data generating software, and that, when executed by the at least one processor, causes the information processing apparatus to perform operations including
generating settings information based on information input on a settings screen provided by the extension application, and
performing an extended function provided by the extension application based on the generated settings information,
wherein information regarding the extended function is processed so as not be edited by an operating system (OS), and
wherein print data is generated based on the settings information by the print data generating software.

2. The information processing apparatus according to claim 1,
wherein the information regarding the extended function is described in the settings information so as not to be edited by the OS.

3. The information processing apparatus according to claim 1,
wherein the information regarding the extended function is stored in a file different from the settings information.

4. The information processing apparatus according to claim 1,
wherein capability information indicating a function provided by the print data generating software is extended by adding information indicating the extended function to the capability information.

5. The information processing apparatus according to claim 1, wherein the OS checks consistency between capability information indicating a function provided by the print data generating software and a function described in the settings information.

6. The information processing apparatus according to claim 1,
wherein the print data is generated by the print data generating software based on intermediate data including drawing data generated by a drawing application and the settings information.

7. The information processing apparatus according to claim 6,
wherein, when information regarding the extended function concerning layout is stored as the information regarding the extended function, the intermediate data is edited by the extension application.

8. The information processing apparatus according to claim 6,
wherein, when information regarding the extended function concerning print preview is stored as the information regarding the extended function, a preview image is displayed using the print data by the extension application.

9. A control method for an information processing apparatus provided with print data generating software that is acquired at first timing and an extension application that is acquired at second timing different from the first timing and that is different from the print data generating software, the control method comprising:
generating settings information based on information input on a settings screen provided by the extension application, and
performing an extended function provided by the extension application based on the generated settings information,
wherein information regarding the extended function is processed so as not be edited by an operating system (OS), and
wherein print data is generated based on the settings information by the print data generating software.

10. The control method according to claim 9,
wherein the information regarding the extended function is described in the settings information so as not to be edited by the OS.

11. The control method according to claim 9,
wherein the information regarding the extended function is stored in a file different from the settings information.

12. The control method according to claim 9,
wherein capability information indicating a function provided by the print data generating software is extended by adding information indicating the extended function to the capability information.

13. The control method according to claim 9,
wherein the OS checks consistency between capability information indicating a function provided by the print data generating software and a function described in the settings information.

14. The control method according to claim 9,
wherein the print data is generated by the print data generating software based on intermediate data including drawing data generated by a drawing application and the settings information.

15. The control method according to claim 14,
wherein, when information regarding the extended function concerning layout is stored as the information regarding the extended function, the intermediate data is edited by the extension application.

16. The control method according to claim 14,
wherein, when information regarding the extended function concerning print preview is stored as the information regarding the extended function, a preview image is displayed using the print data by the extension application.

* * * * *